(12) United States Patent
Chen et al.

(10) Patent No.: US 12,573,098 B2
(45) Date of Patent: Mar. 10, 2026

(54) POINT CLOUD ATTRIBUTE ENCODING METHOD, DECODING METHOD, ENCODING DEVICE, AND DECODING DEVICE

(71) Applicant: PENG CHENG LABORATORY, Shenzhen (CN)

(72) Inventors: Yueru Chen, Shenzhen (CN); Jing Wang, Shenzhen (CN); Wenbo Zhao, Shenzhen (CN); Ge Li, Shenzhen (CN); Wen Gao, Shenzhen (CN)

(73) Assignee: PENG CHENG LABORATORY, Shenzhen (CN)

( * ) Notice: Subject to any disclaimer, the term of this patent is extended or adjusted under 35 U.S.C. 154(b) by 448 days.

(21) Appl. No.: 18/252,872

(22) PCT Filed: Nov. 27, 2020

(86) PCT No.: PCT/CN2020/132450
§ 371 (c)(1),
(2) Date: May 12, 2023

(87) PCT Pub. No.: WO2022/057091
PCT Pub. Date: Mar. 24, 2022

(65) Prior Publication Data
US 2023/0419554 A1      Dec. 28, 2023

(30) Foreign Application Priority Data

Sep. 15, 2020      (CN) .......................... 202010967090.7

(51) Int. Cl.
*G06T 9/00*          (2006.01)
*G06T 9/40*          (2006.01)
(52) U.S. Cl.
CPC ................ *G06T 9/001* (2013.01); *G06T 9/40* (2013.01)

(58) Field of Classification Search
CPC .. G06T 9/001; G06T 9/40; G06T 7/90; G06T 9/00; G06T 17/00; G06T 17/005; G06T 2207/10028; G06F 17/14; G06F 17/148
See application file for complete search history.

(56) References Cited

U.S. PATENT DOCUMENTS

| | | | | |
|---|---|---|---|---|
| 2017/0347100 A1* | 11/2017 | Chou | .................. | H03M 7/3059 |
| 2019/0081638 A1* | 3/2019 | Mammou | ............ | H04N 19/436 |

(Continued)

FOREIGN PATENT DOCUMENTS

| | | |
|---|---|---|
| CN | 107292192 A | 10/2017 |
| CN | 107958163 A | 4/2018 |

(Continued)

OTHER PUBLICATIONS

Zhang, Sujun, et al. "A 3D Haar wavelet transform for point cloud attribute compression based on local surface analysis." 2019 Picture Coding Symposium (PCS). IEEE, 2019. (Year: 2019).*

(Continued)

*Primary Examiner* — Henok Shiferaw
*Assistant Examiner* — Toluwani Mary-Jane Ijaseun
(74) *Attorney, Agent, or Firm* — Buchalter; Jason W. Croft

(57) ABSTRACT

A point cloud attribute encoding method, a decoding method, an encoding device and a decoding device are disclosed, the point cloud attribute encoding method including: constructing an N-layer binary tree by partitioning a target point cloud according to positions of points within the point cloud, N being an integer greater than 1; for a target node at layer P of the binary tree, obtaining child nodes of the target node, determining a first attribute coefficient and second attribute coefficients of the target node by transforming first attribute coefficients of the child nodes, P being an integer greater than or equal to 1 and less than or equal to (Continued)

| | |
|---|---|
| constructing an N-layer binary tree by partitioning a target point cloud according to positions of points within the point cloud, N being an integer greater than 1 | S10 |
| for a target node at layer P of the binary tree, obtaining child nodes of the target node, determining a first attribute coefficient and second attribute coefficients of the target node by transforming first attribute coefficients of the child nodes, P being an integer greater than or equal to 1 and less than or equal to N-1 | S20 |
| using the first attribute coefficient of a root node and the second attribute coefficients of each target node in the binary tree as output coefficients of the point cloud attribute encoding method, wherein the first attribute coefficient of each leaf node in the binary tree is a point cloud attribute value of the leaf node, and the leaf node has no second attribute coefficient | S30 |

N−1; using the first attribute coefficient of a root node and the second attribute coefficients of each target node in the binary tree as output coefficients of the point cloud attribute encoding method.

18 Claims, 5 Drawing Sheets

(56) References Cited

U.S. PATENT DOCUMENTS

| | | | |
|---|---|---|---|
| 2019/0174137 A1* | 6/2019 | He | H04N 19/61 |
| 2019/0311502 A1 | 10/2019 | Mammou et al. | |
| 2019/0355152 A1 | 11/2019 | Li et al. | |
| 2020/0021856 A1* | 1/2020 | Tourapis | H04N 19/13 |
| 2020/0137399 A1* | 4/2020 | Li | H04N 19/593 |
| 2020/0302651 A1* | 9/2020 | Flynn | G06T 9/20 |
| 2022/0292730 A1* | 9/2022 | Gao | G06T 9/005 |
| 2022/0360823 A1* | 11/2022 | Oh | G06T 9/40 |
| 2024/0185468 A1* | 6/2024 | Zhang | H04N 19/13 |

FOREIGN PATENT DOCUMENTS

| | | |
|---|---|---|
| CN | 108632607 A | 10/2018 |
| CN | 111405281 A | 7/2020 |
| CN | 111602176 A | 8/2020 |
| WO | WO-2020072665 A1 * | 4/2020 ............ G06T 15/20 |
| WO | 2022057091 A1 | 3/2022 |

OTHER PUBLICATIONS

Gu, Shuai, et al. "3D point cloud attribute compression via graph prediction." IEEE Signal Processing Letters 27 (Jan. 2020): 176-180. (Year: 2020).*

De Queiroz, Ricardo L., and Philip A. Chou. "Compression of 3D point clouds using a region-adaptive hierarchical transform." IEEE Transactions on Image Processing 25.8 (2016): 3947-3956. (Year: 2016).*

Shao, Yiting, et al. "Hybrid point cloud attribute compression using slice-based layered structure and block-based intra prediction." Proceedings of the 26th ACM international conference on Multimedia. 2018. (Year: 2018).*

Gu, Shuai, et al. "Compression of 3D point clouds using 1D discrete cosine transform." 2017 International Symposium on Intelligent Signal Processing and Communication Systems (ISPACS). IEEE, 2017. (Year: 2017).*

International Search Report and Written Opinion in PCT/CN2020/132450 mailed Jun. 22, 2021.

De Queiroz et al., "Compression of 3D Point Clouds Using a Region-Adaptive Hierarchical Transform." IEEE Transactions on Image Processing 25.8 (2016): 3947-3956.

First Office Action and Search Report of Chinese Patent Application No. 202010967090.7 mailed Jul. 12, 2025, 24 pages with translations.

* cited by examiner

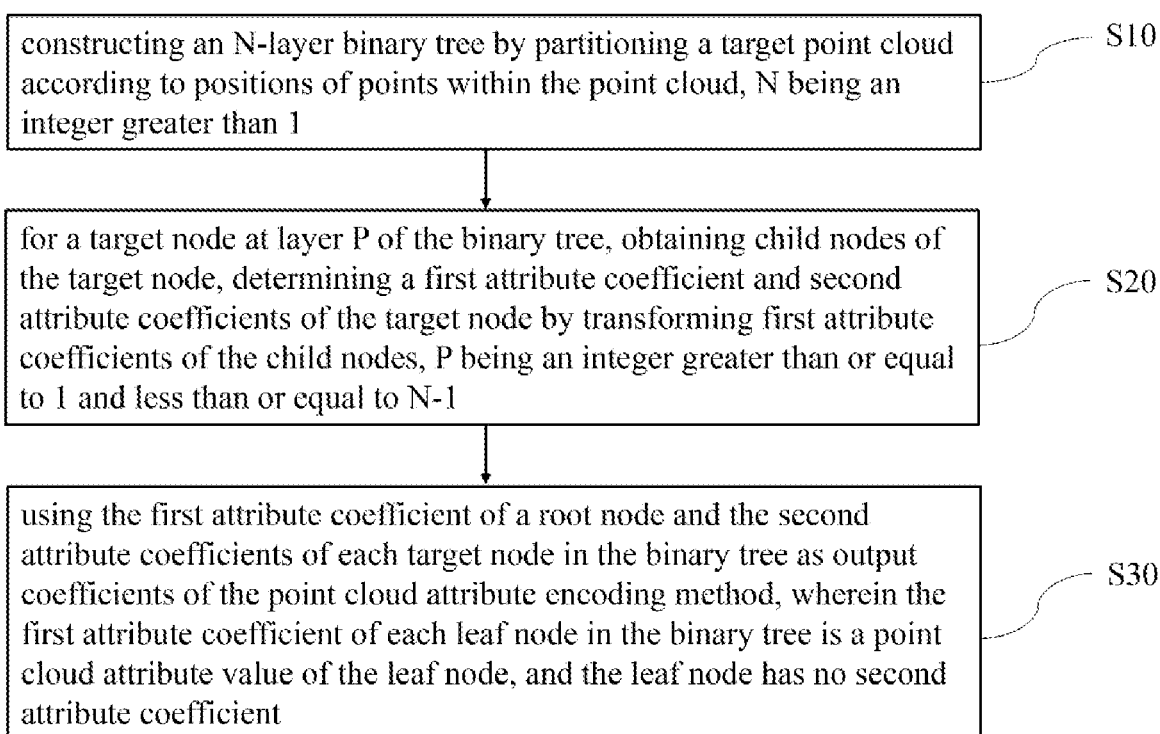

constructing an N-layer binary tree by partitioning a target point cloud according to positions of points within the point cloud, N being an integer greater than 1 — S10 for a target node at layer P of the binary tree, obtaining child nodes of the target node, determining a first attribute coefficient and second attribute coefficients of the target node by transforming first attribute coefficients of the child nodes, P being an integer greater than or equal to 1 and less than or equal to N-1 — S20 using the first attribute coefficient of a root node and the second attribute coefficients of each target node in the binary tree as output coefficients of the point cloud attribute encoding method, wherein the first attribute coefficient of each leaf node in the binary tree is a point cloud attribute value of the leaf node, and the leaf node has no second attribute coefficient — S30

FIG. 1

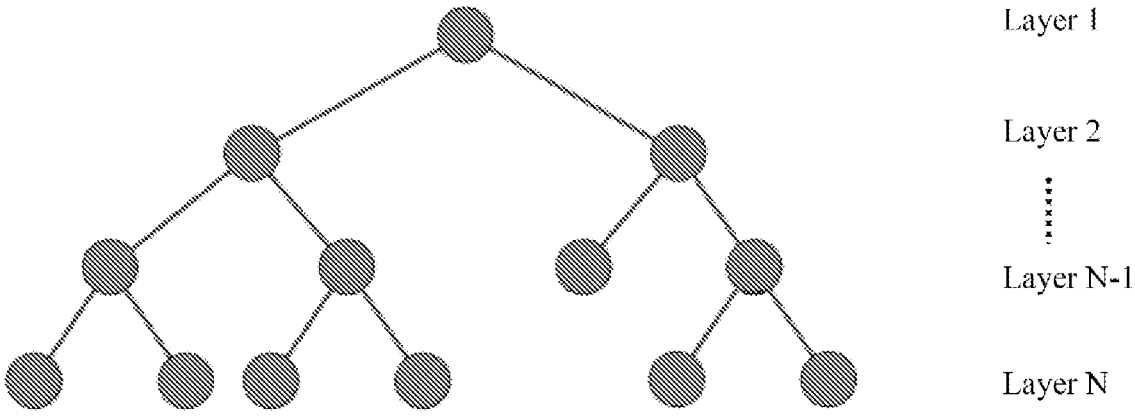

Layer 1

Layer 2

Layer N-1

Layer N

FIG. 2

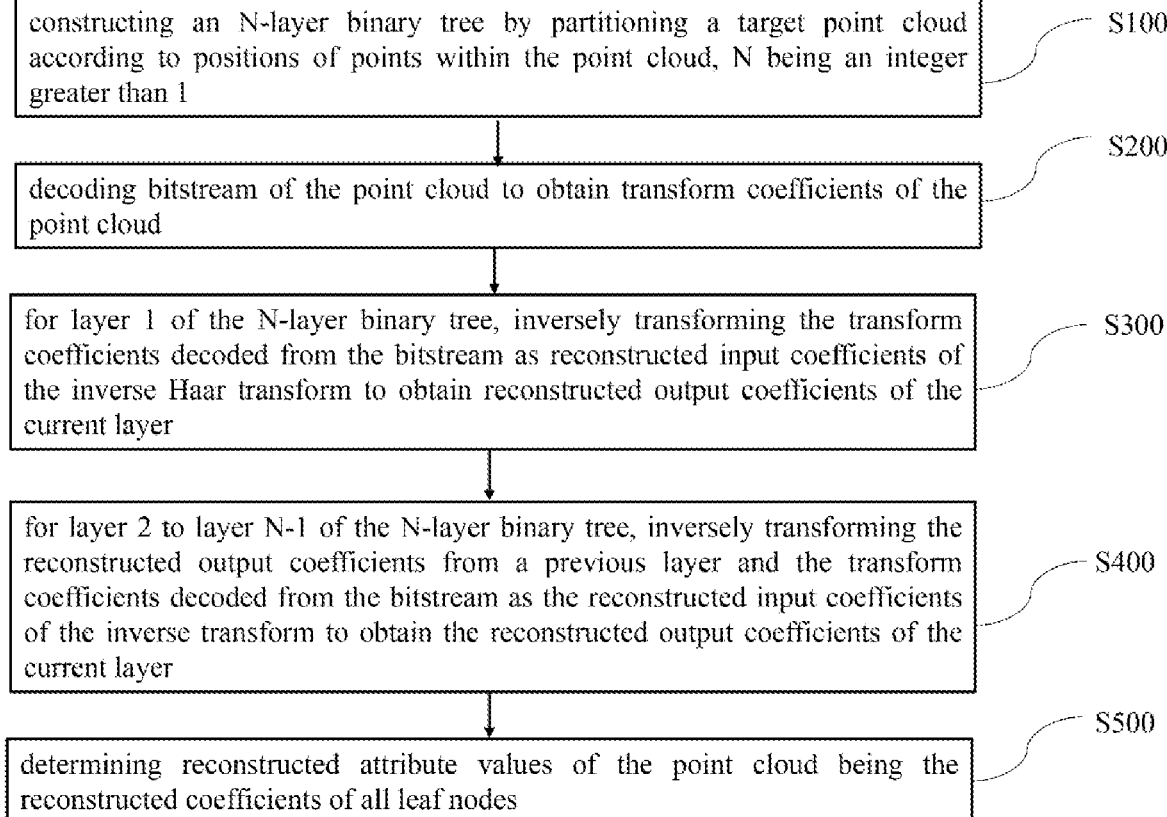

constructing an N-layer binary tree by partitioning a target point cloud according to positions of points within the point cloud, N being an integer greater than 1                                                                                                                          ⟋ S100 decoding bitstream of the point cloud to obtain transform coefficients of the point cloud                                                                                                                          ⟋ S200 for layer 1 of the N-layer binary tree, inversely transforming the transform coefficients decoded from the bitstream as reconstructed input coefficients of the inverse Haar transform to obtain reconstructed output coefficients of the current layer                                                                                                   ⟋ S300 for layer 2 to layer N-1 of the N-layer binary tree, inversely transforming the reconstructed output coefficients from a previous layer and the transform coefficients decoded from the bitstream as the reconstructed input coefficients of the inverse transform to obtain the reconstructed output coefficients of the current layer                                                                                              ⟋ S400 determining reconstructed attribute values of the point cloud being the reconstructed coefficients of all leaf nodes                                                                                    ⟋ S500

FIG. 5

POINT CLOUD ATTRIBUTE ENCODING METHOD, DECODING METHOD, ENCODING DEVICE, AND DECODING DEVICE

TECHNICAL FIELD

The present invention relates to the technical field of point cloud processing, and in particular to a point cloud attribute encoding method, a decoding method, an encoding device and a decoding device.

BACKGROUND 3D point cloud is an important representation of the digitization of the real world. With the rapid development of 3D scanning devices (such as laser, radar, etc.), the accuracy and resolution of point clouds become higher. High-precision point clouds are widely used in the construction of digital maps of cities, and play a technical support role in many popular researches such as smart cities, unmanned vehicles, and heritage conservation. Point cloud is obtained by sampling the surface of an object by a 3D scanning device, a frame of point cloud points includes generally a million points, where each point contains geometry information and color, reflectance and other attribute information, the data volume is very huge. The huge data volume of 3D point cloud brings huge challenges to data storage and transmission, so it becomes very important to compress the point cloud.

Point cloud compression is mainly divided into geometry compression and attribute compression. Currently, the point cloud attribute compression framework described in the testbed PCEM provided by AVS (Audio Video coding Standard Work Group of China) Point Cloud Compression Group mainly relies on prediction with nearest neighbor points. However, the above-mentioned related techniques do not make good use of the correlation of point cloud attributes, which leads to degraded compression performance.

Therefore, the existing technology still needs to be improved and developed.

SUMMARY

The present invention provides a point cloud attribute encoding method, a decoding method, an encoding device and a decoding device. The aim is to solve the problem that the existing point cloud attribute encoding and decoding methods cannot effectively utilize the attribute correlation between child nodes, resulting in poor performance of point cloud attribute compression.

In order to solve the above technical problem, the technical solutions used in the present invention are as follows:

A point cloud attribute encoding method is provided, including:

constructing an N-layer binary tree by partitioning a target point cloud according to positions of points within the point cloud, N being an integer greater than 1;

for a target node at layer P of the binary tree, obtaining child nodes of the target node, determining a first attribute coefficient and second attribute coefficients of the target node by transforming first attribute coefficients of the child nodes, P being an integer greater than or equal to 1 and less than or equal to N−1;

using the first attribute coefficient of a root node and the second attribute coefficients of each target node in the binary tree as output coefficients of the point cloud attribute encoding method, wherein the first attribute coefficient of each leaf node in the binary tree is a point cloud attribute value of the leaf node, and the leaf node has no second attribute coefficient.

In the point cloud attribute encoding method, wherein the binary tree includes: a binary tree based on a point cloud geometry and a set one-dimensional order; or a K-D tree based on the point cloud geometry and a set S-dimensional order, S being a natural number.

In the point cloud attribute encoding method, wherein the N-layer binary tree is a K-D tree based on the point cloud geometry and a set S-dimensional order, for the target nodes at different layers of the N-layer K-D tree, the transforming includes:

for each node at layer N−2 of the N-layer K-D tree, obtaining child nodes of the node at layer N−1 and layer N, determining the first attribute coefficient and the second attribute coefficients of the node based on the first attribute coefficients of the child nodes;

for each node at layer M of the K-D tree, obtaining two child nodes of the node, determining the first attribute coefficient and the second attribute coefficients of the node by transforming the first attribute coefficients of the two child nodes with Haar wavelet, wherein M being an integer greater than or equal to 1 and less than or equal to N−3.

In the point cloud attribute encoding method, wherein determining the first attribute coefficient and the second attribute coefficients for each node at the layer N−2 of the N-layer K-D tree includes:

for each non-leaf node at the layer N−1 of the N-layer K-D tree, obtaining two child nodes of the node, determining the first attribute coefficient of the node as $(a1+a2)/2$ and the second attribute coefficient as $(a1−a2)/2$, wherein a1 and a2 being the first attribute coefficients of the two child nodes, respectively;

for each node at the layer N−2 of the N-layer K-D tree, obtaining two child nodes of the node, determining the first attribute coefficient and the second attribute coefficients of the node with the first attribute coefficients of the two child nodes in the same way as described above, taking the second attribute coefficients of the two child nodes also as the second attribute coefficients of the target node.

In the point cloud attribute encoding method, wherein determining the first attribute coefficient and the second attribute coefficients for each node at the layer N−2 of the N-layer K-D tree includes:

for each node at the layer N−2 of the N-layer K-D tree, obtaining K child leaf nodes of the node at the layer N−1 and the layer N, K being an integer greater than or equal to 2 and less than or equal to 4, performing a one-dimensional discrete cosine transform on the first attribute coefficients of the K child leaf nodes, taking low-frequency DC coefficient as the first attribute coefficient of the node, taking remaining high-frequency AC coefficients as the second attribute coefficients of the node; normalizing the first and the second attribute coefficients of the node by dividing with $\sqrt{K}$.

In the point cloud attribute encoding method, wherein determining the first attribute coefficient and the second attribute coefficients for each node at each layer from layer N−3 to layer 1 of the N-layer K-D tree includes:

obtaining two child nodes of the node, with the first attribute coefficients of the two child nodes being a1 and a2 respectively;

determining the first attribute coefficient of the node as $(a1+a2)/\sqrt{2}$ and the second attribute coefficient of the node as $(a1-a2)/\sqrt{2}$ by transforming the first attribute coefficients of the two child nodes with Haar wavelet transform.

In the point cloud attribute encoding method, wherein the N-layer binary tree is constructed based on a point cloud geometry and a set one-dimensional order, for the target nodes at different layers of the N-layer binary tree, the transforming includes:

transforming from layer N−1 to layer 1 of the N-layer binary tree based on the constructed N-layer binary tree;

for each node at layer z of the binary tree, wherein z=Z, Z+1, . . . , N−1: if the node has two child nodes, determining the first attribute coefficient and the second attribute coefficients of the node by transforming the first attribute coefficients of the two child nodes with the transform matrix $$T_2 = \frac{1}{2}\begin{pmatrix} 1 & 1 \\ 1 & -1 \end{pmatrix};$$

if the node has only one child node, the node has only the first attribute coefficient without the second attribute coefficient, determining the first attribute coefficient of the node equal to the first attribute coefficient of the child node;

for each node at layer n of the binary tree, wherein n=1, 2, . . . , Z−1: if the node has two child nodes, determining the first attribute coefficient and the second attribute coefficients of the node by transforming the first attribute coefficients of the two child nodes with the transform matrix $$T_1 = \frac{1}{\sqrt{2}}\begin{pmatrix} 1 & 1 \\ 1 & -1 \end{pmatrix};$$

if the node has only one child node, the node has only the first attribute coefficient without the second attribute coefficient, determining the first attribute coefficient of the node equal to the first attribute coefficient of the child node multiplied by $\sqrt{2}$.

In the point cloud attribute encoding method, wherein after determining output coefficients of the point cloud attribute encoding method by the first attribute coefficient of the root node and the second attribute coefficients of other nodes in the binary tree, the method further includes:

entropy encoding the output coefficients to obtain a bitstream of transform coefficients;

or, quantizing the output coefficients to obtain quantized transform coefficients; entropy encoding the quantized transform coefficients to obtain a bitstream of the quantized transform coefficients.

In the point cloud attribute encoding method, wherein before transforming with Haar wavelet, the method further includes:

converting attribute values from RGB color space to YUV color space.

In the point cloud attribute encoding method, wherein after determining output coefficients of the point cloud attribute encoding method by the first attribute coefficient of the root node and the second attribute coefficients of other nodes in the binary tree, the method further includes:

determining an attribute residual value of a point in the point cloud as a difference between an original attribute value and a reconstructed attribute value; entropy encoding the attribute residual value to obtain a bitstream of the attribute residual value;

or, determining an attribute residual value of a point in the point cloud as a difference between an original attribute value and a reconstructed attribute value; quantizing the attribute residual value to obtain a quantized attribute residual coefficient; entropy encoding the quantized attribute residual coefficient to obtain a bitstream of the attribute residual value;

or, determining an attribute residual value of a point in the point cloud as a difference between an original attribute value and a reconstructed attribute value; quantizing the attribute residual value to obtain a quantized attribute residual coefficient; entropy encoding the quantized attribute residual coefficient to obtain a bitstream of the attribute residual value; entropy encoding a remainder value of attribute quantization.

A point cloud attribute encoding device is provided, including:

one or more processors, a memory, an encoding module and a bus;

the memory storing program instructions which is executable by the one or more processors;

the bus connecting the one or more processors and the memory;

the one or more processors configured for calling the encoding module to execute the program instructions to implement the steps in the point cloud attribute encoding method of the present invention.

A point cloud attribute decoding method is provided, including:

constructing an N-layer binary tree by partitioning a target point cloud according to positions of points within the point cloud, N being an integer greater than 1;

decoding bitstream of the point cloud to obtain transform coefficients of the point cloud;

for layer 1 of the N-layer binary tree, inversely transforming the transform coefficients decoded from the bitstream as reconstructed input coefficients of the inverse transform to obtain reconstructed output coefficients of the current layer;

for layer 2 to layer N−1 of the N-layer binary tree, inversely transforming the reconstructed output coefficients from a previous layer and the transform coefficients decoded from the bitstream as the reconstructed input coefficients of the inverse transform to obtain the reconstructed output coefficients of the current layer;

determining reconstructed attribute values of the point cloud being the reconstructed coefficients of all leaf nodes.

In the point cloud attribute decoding method, wherein the binary tree incudes: a binary tree based on a point cloud geometry and a set one-dimensional order; or a K-D tree based on the point cloud geometry and a set S-dimensional order, wherein S being a natural number.

In the point cloud attribute decoding method, wherein the N-layer binary tree is a K-D tree based on the point cloud geometry and a set S-dimensional order, for the target nodes at different layers of the N-layer K-D tree, the inverse transform including:

for each node at layer 1 to layer N−3 of the N-layer K-D tree, determining reconstructed output coefficients of the node by inversely transforming reconstructed input coefficients with Haar wavelet;

for each node at layer N−2 of the N-layer K-D tree, determining reconstructed output coefficients of the node by inversely transforming reconstructed input coefficients of the node as reconstructed input coefficients of the child nodes at layer N−1 and layer N of the node.

In the point cloud attribute decoding method, wherein determining the reconstructed output coefficients of the node at layer 1 to layer N−3 of the N-layer K-D tree includes:

determining the reconstructed output coefficients of the node as $(b1+b2)/\sqrt{2}$ and $(b1-b2)/\sqrt{2}$ by inversely transforming the reconstructed input coefficients of the node which are b1 and b2 respectively with Haar wavelet.

In the point cloud attribute decoding method, wherein determining the reconstructed output coefficients of the node at layer N−2 of the N-layer K-D tree includes:

for each node at the layer N−2 of the N-layer K-D tree, obtaining two child nodes at layer N−1 of the node, determining the reconstructed output coefficients of the node as (b1+b2) and (b1−b2) by inversely transforming the reconstructed input coefficients of the node which are b1 and b2 respectively, determining the reconstructed output coefficients of the node as the reconstructed input coefficients of the two child nodes at the layer N−1 of the node;

for each non-leaf node at the layer N−1 of the N-layer K-D tree, obtaining two child leaf nodes at the layer N of the node, determining the two reconstructed output coefficients of the node in the same way as above by inversely transforming the reconstructed output coefficients from a previous layer and the transform coefficients decoded from the bitstream as the reconstructed input coefficients.

In the point cloud attribute decoding method, wherein determining the reconstructed output coefficients of the node at the layer N−2 of the N-layer binary tree includes:

for each node at the layer N−2 of the N-layer binary tree, obtaining K child leaf nodes at the layer N−1 and the layer N of the node, K being an integer greater than or equal to 2 and less than or equal to 4, inversely normalizing the reconstructed input coefficients of the node by multiplying with $\sqrt{K}$, determining the K reconstructed output coefficients of the node by performing inverse one-dimensional discrete cosine transform.

In the point cloud attribute decoding method, wherein the N-layer binary tree is a K-D tree based on a point cloud geometry and a set one-dimensional order, for the target nodes at different layers of the N-layer binary tree, the inverse transform includes:

inversely transforming from layer 1 to layer N−1 of the binary tree based on the constructed N-layer binary tree;

for each node at layer n of the binary tree, wherein n=1, 2, . . . , Z−1: if the node has two child nodes, determining the two reconstructed output coefficients of the node by inversely transforming the reconstructed input coefficients of the node with the inverse transform matrix $$T_1^{-1} = \frac{1}{\sqrt{2}}\begin{pmatrix} 1 & 1 \\ 1 & -1 \end{pmatrix}$$

as the reconstructed input coefficients of the inverse transform of the two child nodes at layer n+1 of the node; if the node has only one child node, the node has only one reconstructed input coefficient, determining the reconstructed output coefficient of the node equal to the reconstructed input coefficient of the node divided by $\sqrt{2}$ as the reconstructed input coefficient of the only one child node.

for each node at layer z of the binary tree, wherein z=Z, Z+1, . . . , N−1: if the node has two child nodes, determining the two reconstructed output coefficients of the node by inversely transforming the reconstructed input coefficients of the node with the inverse transform matrix $$T_2^{-1} = \begin{pmatrix} 1 & 1 \\ 1 & -1 \end{pmatrix}$$

as the reconstructed input coefficients of the two child nodes at layer z+1 of the node; if the node has only one child node, the node has only one reconstructed input coefficient, determining the reconstructed output coefficient of the node equal to the reconstructed input coefficient of the node.

In the point cloud attribute decoding method, wherein decoding the bitstream of the point cloud to obtain the transform coefficients of the point cloud including:

entropy decoding the bitstream of the point cloud to obtain the transform coefficients of the point cloud;

or, entropy decoding the bitstream of the point cloud to obtain quantized transform coefficients; dequantizing the quantized transform coefficients to obtain the transform coefficients of the point cloud.

In the point cloud attribute decoding method, wherein after transforming with Haar wavelet, the method further includes: converting reconstructed attribute values from YUV color space to RGB color space.

In the point cloud attribute decoding method, wherein after determining the inversely-transformed reconstructed attribute values of the point cloud as the reconstructed coefficients of all leaf nodes, the method further includes:

entropy decoding a bitstream of the point cloud to obtain attribute residual values; determining reconstructed attribute values of the point cloud as a sum of the attribute residual values and the inversely-transformed reconstructed attribute values of the point cloud;

or, entropy decoding a bitstream of the point cloud to obtain quantized attribute residual coefficients; dequantizing the quantized attribute residual coefficients to obtain dequantized attribute residual values; determining reconstructed attribute values of the point cloud as a sum of the dequantized attribute residual values and the inversely-transformed reconstructed attribute values of the point cloud;

or, entropy decoding a bitstream of the point cloud to obtain quantized attribute residual coefficients and quantized attribute residual remainders; dequantizing the quantized attribute residual coefficients to obtain dequantized attribute residual values; determining reconstructed attribute values of the point cloud as a sum of the dequantized attribute residual values, the quantized attribute residual remainders, and the inversely-transformed reconstructed attribute values of the point cloud.

A point cloud attribute decoding device is provided, including:

one or more processors, a memory, a decoding module and a bus;

the memory storing program instructions which is executable by the one or more processors;

the bus connecting the one or more processors and the memory;

the one or more processors configured for calling the encoding module to execute the program instructions to implement the steps in the point cloud attribute decoding method of the present invention.

Beneficial effect: Compared with the existing technology, the point cloud attribute encoding method and decoding method provided by the present invention solve the problem of sparse characteristics of point cloud data and can enhance the utilization of attribute correlation between child nodes, thus effectively improving the performance of point cloud attribute compression.

BRIEF DESCRIPTION OF DRAWINGS

FIG. 1 shows a first flow chart of a preferred embodiment of a point cloud encoding method provided by the present invention.

FIG. 2 shows a schematic diagram of a K-D tree constructed by the present invention.

FIG. 5 shows a first flow chart of a preferred embodiment of a point cloud attribute decoding method provided by the present invention.

DETAILED DESCRIPTION

Figure 3:
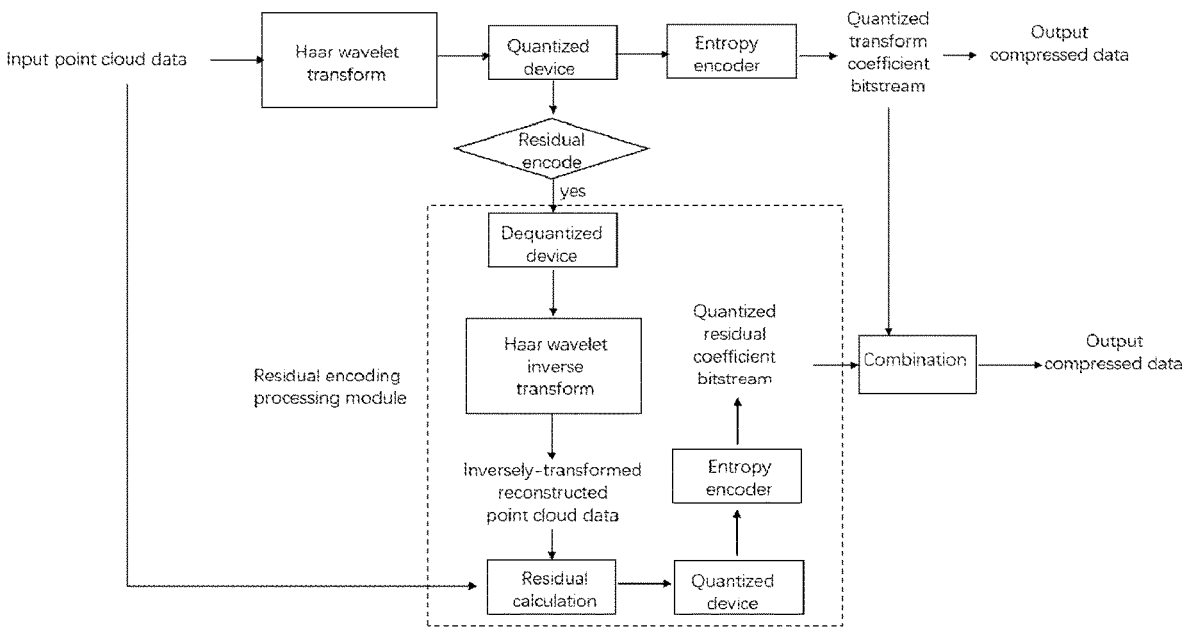
FIG. 3 shows a second flow chart of a point cloud attribute encoding method provided by the present invention.

The present invention provides a point cloud attribute encoding method, a decoding method, an encoding device and a decoding device. In order to make the object, technical solution and effect of the present invention clearer and more explicit, the present invention is further described in detail hereinafter with reference to the accompanying drawings and by way of example. It should be understood that the specific embodiments described herein are only for explaining the present invention and are not intended to limit the present invention.

It will be understood by those of ordinary skills in the art that, unless specifically stated, the singular forms "one," "a," "said", and "the" as used herein" may also include the plural form. It should be further understood that the wording "includes" as used in the specification of the present invention refers to the presence of the described features, integers, steps, operations, components and/or assemblies, but does not exclude the presence or addition of one or more other features, integers, steps, operations, components, assemblies and/or groups thereof. It should be understood that when this embodiment refers to a component being "connected" or "coupled" to another component, it may be directly connected or coupled to other components, or there may be intermediate components. In addition, "connected" or "coupled" as used herein may include wirelessly connected or wirelessly coupled. The word "and/or" as used herein includes all or any of the units and all combinations of one or more of the associated listed items.

It will be understood by those of ordinary skills in the art that all terms used herein (including technical terms and scientific terms), unless otherwise defined, have the same meaning as generally understood by those of ordinary skill in the art to which the present invention belongs. It is also to be understood that terms such as those defined in the general dictionary are to be understood as having a meaning consistent with the meaning in the context of the existing technology and are not to be interpreted in an idealized or overly formal sense unless specifically defined as they are herein.

The following is a further description of the invention by means of a description of embodiments in conjunction with the accompanying drawings.

Referring to FIG. 1, FIG. 1 shows a flowchart of a preferred embodiment of a point cloud attribute encoding method provided by the present invention, as shown, including the steps of:

S10, constructing an N-layer binary tree by partitioning a target point cloud according to positions of points within the point cloud, N being an integer greater than 1;

S20, for a target node at layer P of the binary tree, obtaining child nodes of the target node, determining a first attribute coefficient and second attribute coefficients of the target node by transforming first attribute coefficients of the child nodes, P being an integer greater than or equal to 1 and less than or equal to N−1;

S30, using the first attribute coefficient of a root node and the second attribute coefficients of each target node in the binary tree as output coefficients of the point cloud attribute encoding method, wherein the first attribute coefficient of each leaf node in the binary tree is a point cloud attribute value of the leaf node, and the leaf node has no second attribute coefficient.

In this embodiment, the binary tree includes, but is not limited to, a binary tree based on a point cloud geometry and a set one-dimensional order, or a K-D tree based on the point cloud geometry and a three-dimensional order.

The following is an example of the point cloud attribute encoding method with the binary tree as a K-D tree, and the steps S10-S30 are executed at the encoding end to realize the attribute transform encoding of the point cloud. This embodiment applies the Haar wavelet transform to the attribute encoding of the point cloud, which is implemented as follows: first, the point cloud is decomposed into a K-D tree to obtain a K-D tree structure with N layers, and each leaf node of the K-D tree corresponds to an attribute value (such as color) of a three-dimensional point of the point cloud to be encoded, and this attribute value is set to be the DC attribute coefficient of this leaf node, Haar wavelet transform is applied based on the binary tree structure as shown in FIG. 2. The K-D tree constructed in this example is a binary tree structure as shown in FIG. 2, and the steps of dividing the 3D point coordinates are as follows: for each node, first select a direction from x, y, z (generally the direction with the largest variance, i.e., the direction with the most discrete point distribution), and along this direction, divide the space into two, so that the number of 3D points in these two spaces is the same, and these two spaces are the corresponding child nodes; repeat the above steps until there is only one three-dimensional point in the node, stop the division of the node. Unlike the octree division of the point cloud, each node of the constructed K-D tree of this embodiment necessarily contains at least one three-dimensional points, and the leaf node only appears in the $N^{th}$ layer and $(N-1)^{th}$ layer.

In some embodiments, for the target nodes at different layers of the N-layer K-D tree, the transforming includes: for each node at layer N−2 of the N-layer K-D tree, obtaining child nodes of the node at layer N−1 and layer N, determining the first attribute coefficient and the second attribute coefficients of the node based on the first attribute coefficients of the child nodes; for each node at layer M of the K-D tree, obtaining two child nodes of the node, determining the first attribute coefficient and the second attribute coefficients of the node by transforming the first attribute coefficients of the two child nodes with Harr wavelet, wherein M being an integer greater than or equal to 1 and less than or equal to N−3.

In some embodiments, determining the first attribute coefficient (DC coefficients) and the second attribute coefficients (AC coefficients) for each node at the layer N−2 of the N-layer K-D tree includes: for each non-leaf node at the layer N−1 of the N-layer K-D tree, obtaining two child nodes of the node, determining the first attribute coefficient of the node as (a1+a2)/2 and the second attribute coefficient as (a1−a2)/2, wherein a1 and a2 being the first attribute coefficients of the two child nodes, respectively; for each node at the layer N−2 of the N-layer K-D tree, obtaining two child nodes of the node, determining the first attribute coefficient and the second attribute coefficients of the node with the first attribute coefficients of the two child nodes in the same way as described above, taking the second attribute coefficients of the two child nodes also as the second attribute coefficients of the target node.

In some other embodiments, determining the first attribute coefficient (DC coefficients) and the second attribute coefficients (AC coefficients) for each node at the layer N−2 of the N-layer K-D tree includes: for each node at the layer N−2 of the N-layer K-D tree, obtaining K child leaf nodes of the node at the layer N−1 and the layer N (child leaf nodes are specifically referred to child nodes which are leaf nodes, here child nodes which are non-leaf nodes are not considered), K being an integer greater than or equal to 2 and less than or equal to 4, performing a one-dimensional discrete cosine transform on the first attribute coefficients of the K child leaf nodes, taking low-frequency DC coefficient as the first attribute coefficient of the node, taking remaining high-frequency AC coefficients as the second attribute coefficients of the node; normalizing the first and the second attribute coefficients of the node by dividing with $\sqrt{K}$.

Specifically, in this embodiment, the point cloud is divided into a K-D tree, and each node of the K-D tree, necessarily, contains at least one point of the point cloud, and the leaf node of the K-D tree contains only one 3D point of the point cloud and appears only at the layers N and N−1. For the layer N−2, the first attribute coefficients and the second attribute coefficients of all nodes are calculated. The K child leaf nodes of the nodes at layer N−1 and layer N are obtained. K is an integer greater than or equal to 2 and less than or equal to 4. The first attribute coefficients of the K child leaf nodes are used as input coefficients for the one dimensional DCT transform. In this embodiment, the input coefficients of the nodes are set as a row vector $F \in R^K$ (K is the number of child leaf nodes), and the transformed coefficients are the row vectors $C=\{c_1, \ldots, c_K\} \in R^K$, and the transform equation is $C=F \times A_K$, and the transform matrix $A_K$ is specifically:

$$K = 2: \quad A_2 = \frac{1}{\sqrt{2}}\begin{pmatrix} 1 & 1 \\ 1 & -1 \end{pmatrix};$$

10

-continued $$K = 3: \quad A_3 = \begin{pmatrix} 0.57735027 & 0.70710678 & 0.40824829 \\ 0.57735027 & 0 & -0.81649658 \\ 0.57735027 & -0.70710678 & 0.40824829 \end{pmatrix};$$

$$K = 4: \quad A_4 = \begin{pmatrix} 0.5 & 0.65328148 & 0.5 & 0.27059805 \\ 0.5 & 0.27059805 & -0.5 & -0.65328148 \\ 0.5 & -0.27059805 & -0.5 & 0.65328148 \\ 0.5 & -065328148 & 0.5 & -0.27059805 \end{pmatrix}.$$

The transformed low-frequency DC coefficient, i.e., $c_1$, is taken as the first attribute coefficient of the target node, and the remaining high frequency AC coefficients, i.e. $c_2, \ldots, c_K$, are taken as the second attribute coefficients of the target node. In some embodiments, the first attribute coefficient and the second attribute coefficients of the target node are normalized by calculating $C'=C/\sqrt{K}C' \in R^K$, as the final coefficients of the target node.

The first attribute coefficients of all nodes at the layer N−2 will be used as input coefficients for the subsequent Haar wavelet transform and will be continued to be transformed. The second attribute coefficients of all nodes at the layer N−2 will be used directly as encoding coefficients and will be quantized and entropy encoded as required.

In some embodiments, starting from layer N−3 and ending at layer 1, two attribute coefficients are calculated for all nodes at each layer, the node contains two child nodes with the first attribute coefficients (DC coefficients) a1, a2, respectively, and the first attribute coefficient for the target node is calculated as $(a1+a2)/\sqrt{2}$ and the second attribute coefficients (AC coefficient) is $(a1−a2)/\sqrt{2}$.

In this embodiment the layer N−1 and the layer N−2 are the pre-processing steps of Haar wavelet transform, and the DC coefficients of the target nodes at layer N−2 can be regarded as the average of the attribute values of the 3D points belonging to the target nodes, and the DC coefficients of the target nodes at layer N−2 are used as the input signals of the Haar wavelet transform. From layer N−3 to layer 1, the Haar wavelet transform is performed, and specifically its transform matrix is $$\frac{1}{\sqrt{2}}\begin{pmatrix} 1 & 1 \\ 1 & -1 \end{pmatrix}.$$

Eventually, the process described will provide a first attribute coefficient of the root node and multiple second attribute coefficients obtained from other different layers, which can be used as encoding coefficients, quantized and entropy encoded.

In some embodiments, the first attribute coefficients of the root node in the K-D tree, and the second attribute coefficients of each target node in the K-D tree are used as the output coefficients of the point cloud attribute coding method. Finally, according to the requirements, the output coefficients are directly entropy encoded to obtain a bitstream of transform coefficients; or the output coefficients are quantized to obtain the quantized transform coefficients, and the quantized transform coefficients are entropy encoded to obtain a bitstream of quantized transform coefficients.

In some embodiments, since the existing transform methods generally cannot achieve lossless attribute encoding, this embodiment designs a residual encoding processing module to solve this problem, and the residual encoding processing module uses the following three ways in encoding: determining an attribute residual value of a point in the point cloud as a difference between an original attribute value and a reconstructed attribute value; entropy encoding the attribute residual value to obtain a bitstream of the attribute residual value; or, determining an attribute residual value of a point in the point cloud as a difference between an original attribute value and a reconstructed attribute value; quantizing the attribute residual value to obtain a quantized attribute residual coefficient; entropy encoding the quantized attribute residual coefficient to obtain a bitstream of the attribute residual value; or, determining an attribute residual value of a point in the point cloud as a difference between an original attribute value and a reconstructed attribute value; quantizing the attribute residual value to obtain a quantized attribute residual coefficient; entropy encoding the quantized attribute residual coefficient to obtain a bitstream of the attribute residual value; entropy encoding a remainder value of attribute quantization.

Specifically, as shown in FIG. 3, this embodiment first transforms the point cloud attributes using the transform method to obtain the transform coefficients, then quantizes them to obtain the quantized transform coefficients, then performs dequantization to obtain the reconstructed transform coefficients, and finally inverse transforms to obtain the reconstructed point cloud attribute values. The reconstructed point cloud attribute and the original point cloud attribute are passed to the residual encoding processing module as input data. In the residual encoding processing module, the attribute residual values of the reconstructed point cloud and the original point cloud are firstly obtained at each 3D geometry point, and then the quantized attribute residual coefficients are obtained by quantizing the attribute residual values according to the requirements, and finally the quantized attribute residual coefficients are entropy encoded. For the near-lossless condition (limited-lossy), the quantized attribute residual coefficients are encoded according to the given quantization step, and the control of Hausdorff error can be achieved. For the lossless condition (lossless), it can be handled in the following two ways: method 1: for the attribute residual coefficients, no quantization is needed, i.e., the quantization step is 1, and the attribute residual coefficients are encoded directly; method 2: for the attribute residual coefficients, the quantized attribute residual coefficients and the remainder values are entropy encoded.

In some embodiments, for color attribute encoding, the calculation of attribute residual values needs to be performed in the color space of the original point cloud. If the reconstructed attribute values of the point cloud generated by the inverse transform are located in a different color space from the attribute values of the original point cloud, e.g., the original attribute values are in RGB color space, while the reconstructed attribute values are in YUV color space. Then the color space conversion is needed to obtain the reconstructed attribute values of the point cloud in the same color space as the original point cloud.

Figure 4:
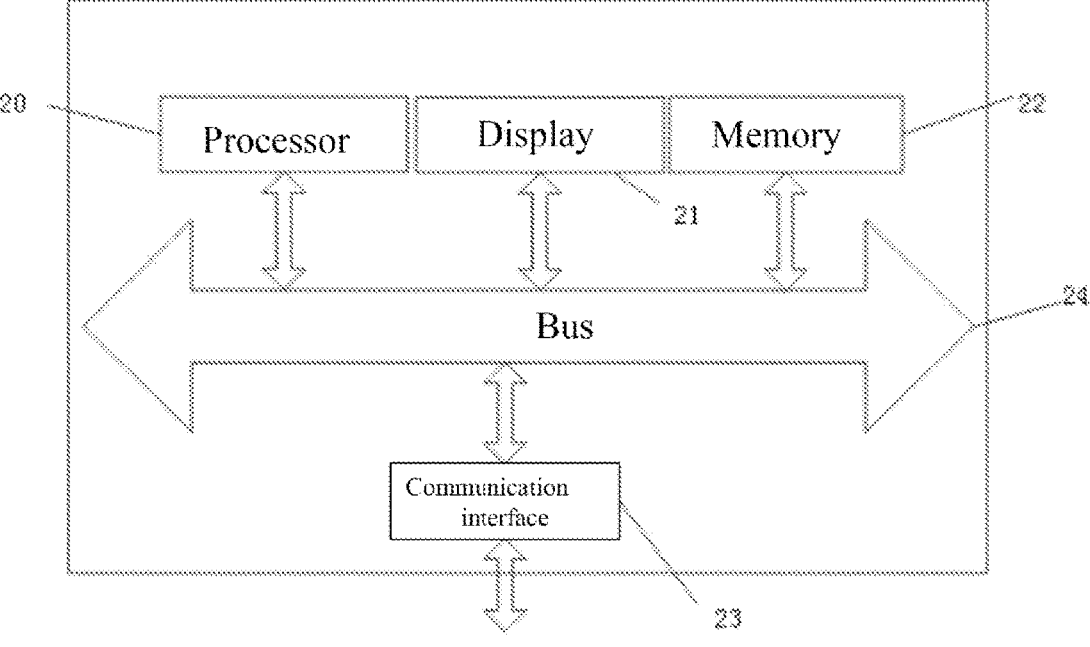
FIG. 4 shows a schematic diagram of the structure of a point cloud attribute encoding device provided by the present invention.

Based on the above point cloud attribute encoding method, the present invention also provides a point cloud attribute encoding device, as shown in FIG. 4, which includes at least one processor 20; a display 21; and a memory 22, and may also include a communication interface 23 and a bus 24. The processor 20, the display 21, the memory 22, and the communication interface 23 may communicate with each other via the bus 24. The display 21 is configured to display a user guidance interface preset in an initial setup mode. The communication interface 23 may transmit information. The processor 20 may call logical instructions in the memory 22 to execute the method in the above embodiment.

In addition, the logic instructions in the memory 22 described above can be stored in a computer-readable storage medium when implemented in the form of a software functional unit and sold or used as a stand-alone product.

The memory 22, as a computer readable storage medium, may be configured to store software programs, computer executable programs, such as program instructions or modules corresponding to the methods in the disclosed embodiments. The processor 20 performs functional applications as well as data processing, i.e., implements the methods in the above embodiment, by running the software program, instructions, or module stored in the memory 22.

The memory 22 may include a program storage area and a data storage area, wherein the program storage area may store the operating system, the application programs required for at least one function; the data storage area may store data created based on the use of the electronic device, etc. In addition, the memory 22 may include high-speed random access memory, and may also include non-volatile memory. For example, USB flash drives, mobile hard drives, Read-Only Memory (ROM), Random Access Memory (RAM), disks or CD-ROMs, and a variety of other media that can store program code, or may also be transient storage media.

In addition, the specific process of loading and executing the plurality of instructions in the above storage media as well as in the point cloud attribute encoding device by the processor has been described in detail in the above methods and will not be described here.

In some embodiments, there is also provided a point cloud attribute decoding method, as shown in FIG. 5, which includes the steps of:

S100, constructing an N-layer binary tree by partitioning a target point cloud according to positions of points within the point cloud, N being an integer greater than 1;

S200, decoding bitstream of the point cloud to obtain transform coefficients of the point cloud;

S300, for layer 1 of the N-layer binary tree, inversely transforming the transform coefficients decoded from the bitstream as reconstructed input coefficients of the inverse Haar transform to obtain reconstructed output coefficients of the current layer;

S400, for layer 2 to layer N−1 of the N-layer binary tree, inversely transforming the reconstructed output coefficients from a previous layer and the transform coefficients decoded from the bitstream as the reconstructed input coefficients of the inverse transform to obtain the reconstructed output coefficients of the current layer;

S500, determining reconstructed attribute values of the point cloud being the reconstructed coefficients of all leaf nodes.

In this embodiment, the binary tree includes, but is not limited to, a binary tree based on a point cloud geometry and a set one-dimensional order; or a K-D tree based on the point cloud geometry and a set three-dimensional order.

The point cloud attribute decoding method is also described below with the binary tree as a K-D tree as an example, and this embodiment applies the Haar wavelet transform to the attribute decoding of the point cloud, which is implemented as follows: firstly, the point cloud is decomposed into a K-D tree to obtain a K-D tree with N layers, and each leaf node of the K-D tree corresponds to the attribute value a 3D point of the point cloud to be reconstructed by decoding. The point cloud bitstream is decoded to obtain the point cloud transform coefficients, including one first attribute coefficient (DC coefficient) of the root node and multiple second attribute coefficients (AC coefficients) from different nodes.

For the layer 1 (root node) of the K-D tree, the transform coefficients (one DC coefficient and one AC coefficient, denoted as b1, b2) decoded from the bitstream are used as the inverse transform input coefficients, and the inverse Haar wavelet transform is performed to obtain two output coefficients a1, a2, calculated as a1=(b1+b2)/$\sqrt{2}$, a2=(b1−b2)/$\sqrt{2}$; a1, a2 will be used as the input DC coefficients of the second layer of the inverse transform.

In some embodiments, for the target nodes at different layers of the N-layer K-D tree, the inverse transform including: starting from the inverse transform of the layer 2 of the K-D tree until the end of the inverse transform of the layer N−3, inversely transforming with haar wavelet the reconstructed output coefficients from a previous layer and the transform coefficients decoded from the bitstream as the reconstructed input coefficients of the inverse transform to obtain the output transform coefficients of the current layer; for each node at the layer N−2 of the N-layer K-D tree, obtaining two child nodes at layer N−1 of the node, determining the reconstructed output coefficients of the node as (b1+b2) and (b1−b2) by inversely transforming the reconstructed input coefficients of the node which are b1 and b2 respectively, determining the reconstructed output coefficients of the node as the reconstructed input coefficients of the two child nodes at the layer N−1 of the node; for each non-leaf node at the layer N−1 of the N-layer K-D tree, obtaining two child leaf nodes at the layer N of the node, determining the two reconstructed output coefficients of the node in the same way as above by inversely transforming the reconstructed output coefficients from a previous layer and the transform coefficients decoded from the bitstream as the reconstructed input coefficients. Specifically, for layer N−2 of the K-D tree, the output coefficients obtained from the inverse transform of the previous layer and the transform coefficients obtained from the decoding of the bitstream (b1 and b2, respectively) are used to calculate the two output coefficients a1 and a2, which are calculated as a1=(b1+b2), a2=(b1−b2). a1 and a2 will be used as input coefficients for the inversion of layer N−1. Specifically, for layer N−1 of the N-layer K-D tree, for leaf nodes, the output coefficients obtained from the previous layer are the reconstructed attribute coefficients of the leaf nodes; for non-leaf nodes, using the output coefficients obtained from the inverse transform of the previous layer and the transform coefficients obtained from the decoding of the bitstream (b1, b2, respectively), two output coefficients a1, a2 are calculated as a1=(b1+b2), a2=(b1−b2). a1, a2 will be used as the reconstructed attribute coefficients of the corresponding child leaf node at layer N.

In some other embodiments, another method of determining the reconstructed output coefficients of the node at the layer N−2 of the N-layer K-D tree includes: for each node at the layer N−2 of the N-layer K-D tree, obtaining K child leaf nodes at the layer N−1 and the layer N of the node, K being an integer greater than or equal to 2 and less than or equal to 4, inversely normalizing the reconstructed input coefficients of the node by multiplying with a, determining the K reconstructed output coefficients of the node by performing inverse one-dimensional discrete cosine transform.

Specifically, after the inverse Haar transform, the output coefficients obtained from the inverse transform and the transform coefficients decoded from the bitstream are used as the input coefficients of the inverse transform of the nodes at the layer N−2, performing the inverse normalization and the inverse DCT transform to obtain the reconstructed attribute values of the point cloud attributes. For all nodes at layer N−2, K child leaf nodes at layer N−1 and layer N are obtained for the target node, and K is an integer greater than or equal to 2 and less than or equal to 4. The input coefficients for the target nodes, denoted as row vectors C'={$c_1'$, . . . , $c_K'$}∈$R^K$, are inverse normalized firstly by C=C'×$\sqrt{K}$, and then the inverse one-dimensional discrete cosine transforms are applied on the row vectors C to obtain the K reconstructed output coefficients of the target node, denoted as F∈$R^K$, which is calculated as F=C×$A_K^T$, where the inverse transform matrix $A_K^T$ is the transpose of the forward transform matrix $A_K$. These K reconstructed output coefficients are used as the reconstructed first attribute coefficients of the corresponding child leaf node, i.e., the reconstructed attribute values of the corresponding point cloud attributes.

Through the above calculation process, all leaf nodes of this embodiment are calculated to get reconstructed attribute coefficients, then accordingly, all reconstructed attribute values of the point cloud can be obtained.

In this embodiment, let the signal within the target transformed node be the row vector F∈$R^2$ (2 child nodes), the output coefficients are the row vectors C ∈$R^2$, and the transform matrix is $$A = \frac{1}{\sqrt{2}}\begin{pmatrix} 1 & 1 \\ 1 & -1 \end{pmatrix}.$$

The Haar transform and the inverse Haar transform can be expressed as:

$$C=F×A \qquad\qquad\qquad \text{Haar transform}$$

$$F=C×A^T \qquad\qquad\qquad \text{inverse Haar transform}$$

In some embodiments, the invented method has better performance in YUV color space for color attributes, if the color attributes of the original point cloud are located in RGB color space, this embodiment can first perform a color space conversion on the color attribute values. The invented method is then performed in YUV color space. Accordingly, during the decoding process, the inverse transform produces the reconstructed color attribute values in YUV space, and the inverse color space conversion is needed to get reconstructed color attribute values in the original color space, i.e. RGB color space.

In some embodiments, decoding the bitstream of the point cloud to obtain the transform coefficients of the point cloud including: entropy decoding the bitstream of the point cloud to obtain the transform coefficients of the point cloud; or, entropy decoding the bitstream of the point cloud to obtain quantized transform coefficients; dequantizing the quantized transform coefficients to obtain the transform coefficients of the point cloud.

In some embodiments, since the existing transform based methods generally cannot achieve lossless attribute decoding, this embodiment designs a residual decoding processing module to solve this problem, and the residual decoding processing module uses the following three ways in decoding: entropy decoding the bitstream of the point cloud to obtain attribute residual values; determining the reconstructed attribute values of the point cloud as a sum of the attribute residual values and the inversely-transformed reconstructed attribute values of the point cloud; or, entropy decoding the bitstream of the point cloud to obtain the quantized attribute residual coefficients; dequantizing the quantized attribute residual coefficients to obtain the dequantized attribute residual values; determining the reconstructed attribute values of the point cloud as a sum of the dequantized attribute residual values and the inversely-transformed reconstructed attribute values of the point cloud; or, entropy decoding the bitstream of the point cloud to obtain the quantized attribute residual coefficients and the quantized attribute residual remainders; dequantizing the quantized attribute residual coefficients to obtain the dequantized attribute residual values; determining the reconstructed attribute values of the point cloud as a sum of the dequantized attribute residual values, the quantized attribute residual remainders, and the inversely-transformed reconstructed attribute values of the point cloud.

Figure 6:
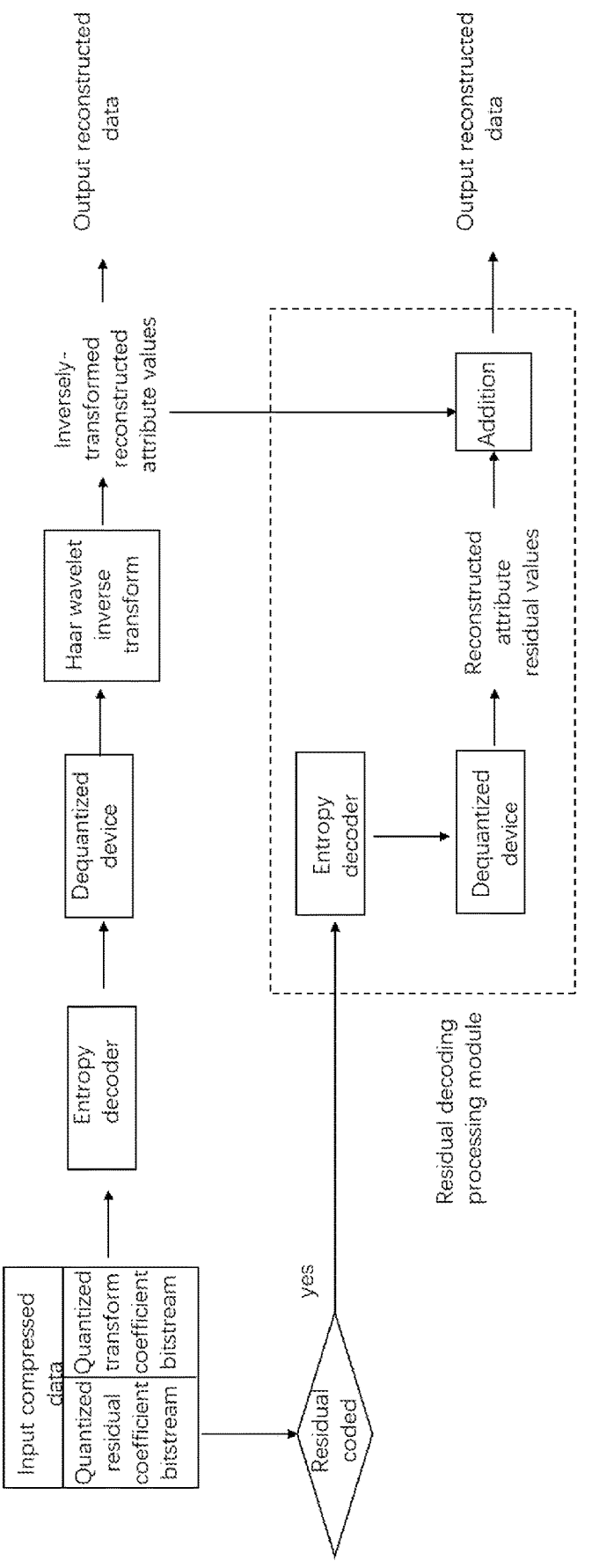
FIG. 6 shows a second flow chart of a point cloud attribute decoding method provided by the present invention.

Specifically, as shown in FIG. 6, the point cloud attribute is first reconstructed using the invented inverse transform method to obtain the reconstructed point cloud attribute values, and the reconstructed point cloud attribute values and the bitstream of quantized attribute residuals are passed to the residual decoding processing module as input data. In the module, firstly, entropy decoding is performed on the bitstream of quantized attribute residuals to obtain the quantized attribute residual coefficients. Then, the dequantization of the quantized attribute residual coefficients is performed to obtain the reconstructed attribute residual values, and finally, the reconstructed attribute residual values are added to the reconstructed point cloud attribute values to obtain the final reconstructed point cloud attribute decoding results.

For the lossless condition (lossless), it can be handled by the following two methods: method 1: for the existing attribute residual bitstream, firstly perform entropy decoding to get the attribute residual values, without using dequantization processing, and directly add the attribute residual values with the reconstructed point cloud attribute value to get the final reconstructed point cloud attribute decoding result; method 2: for the existing quantized attribute residual remainders bitstream and quantized attribute residual coefficients bitstream, firstly perform entropy decoding to obtain the quantized attribute residual remainders and quantized attribute residual coefficients respectively. Then dequantization is performed to obtain dequantized attribute residual values. Finally, the quantized attribute residual remainders, the dequantized attribute residual values and the reconstructed point cloud attribute values are summed to obtain the final reconstructed point cloud attribute decoding results.

In some embodiments, for decoding of color attributes, the residual decoding processing module needs to be performed in the color space of the original point cloud attributes. If the reconstructed point cloud attribute values generated by the inverse transform are located in a different color space from the original point cloud attributes, e.g., the original point cloud attribute is in RGB color space, while the invented method is applied in YUV color space and provides the reconstructed attributes in YUV color space, then the color space conversion is needed to convert the reconstructed attributes to the same color space as the original point cloud attributes.

In some embodiments, a point cloud attribute decoding device based on Haar wavelet transform is provided, which includes a processor, a memory, a decoding module and a bus;

the memory storing program instructions which is executable by the one or more processors;

the bus connecting the one or more processors and the memory;

the one or more processors configured for calling the decoding module to execute the program instructions to implement the steps in the point cloud attribute decoding method of the present invention.

Further, the present invention tested the experimental results of the method in the present embodiment compared with anchor method on PCEM software version v0.5, and the results are shown in Tables 1-4.

Table 1 shows the comparison of the rate distortion of different attribute types, i.e. the luminance, Chrominance and reflectance, under the conditions of limited-lossy geometry and lossy attributes.

| Limited-lossy geometry Lossy attributes | End-to-End BD-AttrRate [Intra] | | | |
| --- | --- | --- | --- | --- |
| | Luma | Chroma Cb | Chroma Cr | Reflectance |
| Reflectance set | — | — | — | −12.4% |
| Color set | −35.4% | −70.6% | −69.0% | — |

Table 2 shows the comparison of the rate distortion of different attribute types, i.e. the luminance, Chrominance and reflectance, under the conditions of lossless geometry and lossy attributes.

| Lossless geometry Lossy attributes | End-to-End BD-AttrRate [%] | | | |
| --- | --- | --- | --- | --- |
| | Luma | Chroma Cb | Chroma Cr | Reflectance |
| Reflectance set | — | — | — | −2.6% |
| Color set | −53.8% | −61.9% | −63.8% | — |

Table 3 shows the comparison of the rate distortion of different attribute types, i.e. the three color channels of red (R), green (G) and blue (B), and reflectance, under the conditions of lossless geometry and limited-lossy attributes.

| Lossless geometry Limited-lossy attributes | End-to-End BD-AttrRate [Intra] | | | |
| --- | --- | --- | --- | --- |
| | R | G | B | Reflectance |
| Reflectance set | — | — | — | −7.0% |
| Color set | −20.8% | −20.8% | −20.8% | — |

Table 4 shows the comparison of the rate of different attribute types, i.e. color and reflectance, under the conditions of lossless geometry and lossless attributes.

| Lossless geometry Lossless attributes | End-to-End Bit Ratio [Intra] | | | |
| --- | --- | --- | --- | --- |
| | Total | Geometry | Color | Reflectance |
| Reflectance set | 92.2% | 100.0% | — | 82.5% |
| Color set | 97.2% | 100.0% | 94.5% | — |

The results in Tables 1-4 show that, compared to the benchmark results of PCEM, under the limited-lossy geometry and lossy attribute conditions, and under the lossless geometry and lossy attribute conditions, the end-to-end attribute rate distortion of the present invention is reduced by 12.4% and 2.6% for the reflectance attribute, by 35.4% and 53.8% for the luminance attribute, by 70.6%, 61.9% for the Cb attribute, and by 69.0%, 63.8% for the Cr attribute, respectively; under lossless geometry and limited-lossy attribute conditions, the end-to-end Hausdorff attribute rate distortion of the present invention is reduced by 7.0% for the reflectance attribute; the end-to-end Hausdorff attribute rate distortion of the present invention is reduced by 20.8% for the color attributes of red (R), green (G), and blue (B) channels; under the lossless geometry and lossless attribute condition, the reflectance bit rate of the present invention is 82.5% of the benchmark result; the color bit rate of the present invention is 94.5% of the benchmark result.

In some embodiments, a binary tree is constructed based on a point cloud geometry and a set one-dimensional order, such as a binary tree constructed based on Morton order, or a binary tree constructed based on Hilbert order. As an example, assuming that the current point cloud has M points, the binary tree can be constructed in either of the following two ways:

One is a top-down construction method, where the root node contains M points of the current point cloud which is divided into two child nodes. The left child node contains the points of ordinal number 1 to M/2, and the right child node contains the points of ordinal (M/2+1) to M. Let the total number of left and right nodes be M0 and M1 at this time; continue to divide the left and right child nodes from the midpoint of the ordinal number, that is four nodes, e.g. containing the points of ordinal number 1 to M0/2, (M0/2+1) to M0, M0+1 to M0+M1/2, (M0+M1/2+1) to M. All nodes are divided according to this method, if the node contains only one point of the cloud point, stop the division and get an N-Layer binary tree.

The other is a bottom-up construction method, where M points are the nodes of the lowest layer of the binary tree (set as the layer N); two adjacent points are merged to form their parent node in order (i.e., points with ordinal numbers 1 and 2 are merged, points with ordinal numbers 3 and 4 are merged, etc.). These parent nodes form the nodes of the layer N−1, and these nodes are arranged in the order of merging (i.e., the parent node of ordinal numbers 1 and 2 are in the first place, the parent node of ordinal numbers 3 and 4 are in the second place, etc.). Two adjacent points of the layer N−1 are merged to form their parent node in order, i.e., the node in the layer N−2, and these parent nodes are arranged in the order of merging. If the number of nodes in layer n is odd, the last node in line becomes the node in layer n−1 (n=2, 3, . . . , N); the nodes in each layer are merged according to this method. The tree construction stops when there is only one node in a layer, which is the root node of the tree (layer 1), and an N-layer binary tree is obtained.

For the N-layer binary tree constructed above, each of all leaf nodes of the binary tree contains one point of the point cloud. For the constructed binary tree, this embodiment can perform a hierarchical transform using the methods of the above embodiments to obtain the first attribute coefficient of the root node, and the second attribute coefficients of the other nodes as the output coefficients of the point cloud, and then quantization and entropy encoding of the output coefficients are applied to obtain the final bitstream.

In some embodiments, for a target node in a binary tree constructed based on a specific order, the child nodes of the target node are obtained, the first attribute coefficient and the second attribute coefficients of the target node are determined by transforming the first attribute coefficients of the child nodes.

In this embodiment, the transform is performed from layer N−1 to layer 1 of the N-layer binary tree based on the constructed N-layer binary tree. For each node at layer z of the binary tree: if the node has two child nodes, determining the first attribute coefficient and the second attribute coefficients of the node by transforming the first attribute coefficients of the two child nodes with the transform matrix $$T_2 = \frac{1}{2}\begin{pmatrix} 1 & 1 \\ 1 & -1 \end{pmatrix};$$

if the node has only one child node, the node has only the first attribute coefficient without the second attribute coefficient, determining the first attribute coefficient of the node equal to the first attribute coefficient of the child node, wherein z=Z, Z+1, . . . , N−1, if Z=N, the transform described above is not performed. For each node at layer n of the binary tree: if the node has two child nodes, determining the first attribute coefficient and the second attribute coefficients of the node by transforming the first attribute coefficients of the two child nodes with the transform matrix $$T_1 = \frac{1}{\sqrt{2}}\begin{pmatrix} 1 & 1 \\ 1 & -1 \end{pmatrix};$$

if the node has only one child node, the node has only the first attribute coefficient without the second attribute coefficient, determining the first attribute coefficient of the node equal to the first attribute coefficient of the child node multiplied by $\sqrt{2}$, wherein n=1, 2, . . . , Z−1, if Z=1, the transform described above is not performed.

The first attribute coefficient of the root node and the second attribute coefficients of each target node in the binary tree are used as the output coefficients of the point cloud attribute encoding method, wherein the first attribute coefficient of each leaf node in the binary tree is a point cloud attribute value of the leaf node, and the leaf node has no second attribute coefficient.

In some embodiments, for layer 1 of the binary tree constructed based on a specific order, inversely transforming the transform coefficients decoded from the bitstream as reconstructed input coefficients of the inverse transform to obtain reconstructed output coefficients of the current layer.

In this embodiment, inversely transforming from layer 1 to layer N−1 of the binary tree based on the constructed N-layer binary tree; for each node at layer n of the binary tree: if the node has two child nodes, determining the two reconstructed output coefficients of the node by inversely transforming the reconstructed input coefficients of the node with the inverse transform matrix $$T_1^{-1} = \frac{1}{\sqrt{2}}\begin{pmatrix} 1 & 1 \\ 1 & -1 \end{pmatrix}$$

as the reconstructed input coefficients of the inverse transform of the two child nodes at layer n+1 of the node; if the node has only one child node, the node has only one reconstructed input coefficient, determining the reconstructed output coefficient of the node equal to the reconstructed input coefficient of the node divided by $\sqrt{2}$ as the reconstructed input coefficient of the only one child node, wherein n=1, 2, . . . , Z−1, if Z=1, then the above described transformation is not performed); for each node at layer z of the binary tree: if the node has two child nodes, determining the two reconstructed output coefficients of the node by inversely transforming the reconstructed input coefficients of the node with the inverse transform matrix $$T_2^{-1} = \begin{pmatrix} 1 & 1 \\ 1 & -1 \end{pmatrix}$$

as the reconstructed input coefficients of the two child nodes at layer z+1 of the node; if the node has only one child node, the node has only one reconstructed input coefficient, determining the reconstructed output coefficient of the node equal to the reconstructed input coefficient of the node, wherein z=Z, Z+1, . . . , N−1. For the reflectance attribute, Z=N, i.e., for each layer the transform matrix is $T_1$, and the inverse transform matrix is $T_1^{-1}$. For the chrominance channels U and V of the color attribute, Z can be set as N−1 properly, i.e., only for layer N−1, the transform matrix and inverse transform matrix, $T_2$, $T_2^{-1}$ are adopted respectively.

Figure 7:
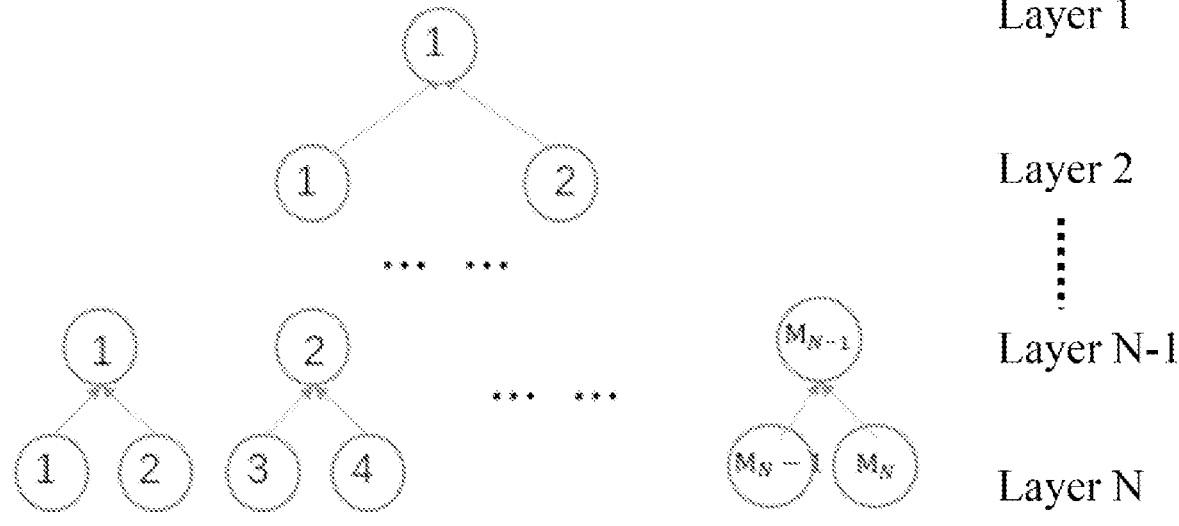
FIG. 7 shows a schematic diagram of constructing a binary tree based on Morton's order.

In some specific embodiments, when performing the reflectance attribute compression, the point cloud is firstly sorted based on the Morton order and the multilayer wavelet transform is performed. As shown in FIG. 7, starting from the layer N, the attribute values of two adjacent nodes in the order are transformed with the following forward and inverse transform matrix:

$$T = T^{-1} = \frac{1}{\sqrt{2}} \begin{pmatrix} 1 & 1 \\ 1 & -1 \end{pmatrix};$$

at the same time the two adjacent nodes are combined to become the node at the layer N−1, and the sum value (DC coefficient) obtained from the transform is used as the attribute value of the node at the layer N−1. If the number of nodes in the layer N is odd, the last node in line is directly defined as the node in the layer N−1 and its attribute value is multiplied by $\sqrt{2}$. The nodes at layer N to layer 2 are transformed two-by-two according to this transform method. The final outputs are the sum value (DC coefficient) of the transform of the nodes at the layer 2 and the difference values (AC coefficients) of the transform at other layers, which are used as the output coefficients for quantization and entropy encoding.

In order to control the maximum error of the reconstructed attribute values obtained by the inverse transform, it is necessary to calculate the residuals between the reconstructed attribute values and the true attribute values as the residual values, and quantize and entropy encode them. This is done by first transforming the point cloud using the above transform method to obtain a set of transform coefficients. Then the transform coefficients are quantized. In some specific embodiments, a larger quantization stepsize is used, i.e.:

$$\begin{cases} Q_{trans} = Q_{set} \times 16, & \text{if } Q_{set} \leq 8 \\ Q_{trans} = 128, & \text{if } 8 < Q_{set} \leq 128 \\ Q_{trans} = Q_{set}, & \text{if } 128 < Q_{set} \end{cases}$$

$Q_{trans}$ is the quantization stepsize of the transform coefficients, and $Q_{set}$ is the given quantization stepsize. Then, the quantized transform coefficients are dequantized and inversely transformed to obtain the reconstructed point cloud attributes. Then the attribute residual values of each spatial point of the reconstructed point cloud and the original point cloud are obtained, and finally, according to the given quantization stepsize $Q_{set}$, the attribute residual values are quantized and entropy encoded.

In some embodiments, when performing the color attribute compression, the color space conversion are first performed on the color attributes, i.e., convert from RGB color space to YUV color space. In the YUV color space, for each of the 3 channels, the invented transform coding method are performed to obtain the transform coefficients. Among them, because the attribute values of the two chrominance channels have high correlation, this embodiment can enlarge their quantization stepsizes accordingly. There are two specific approaches: 1) when quantizing, the quantization stepsize of the two chrominance channels is expanded, i.e., it is twice as the original one; 2) when transforming, the mean value is used to replace the normalized DC coefficients as the first attribute coefficient of the nodes, i.e., the new forward and inverse transform matrixs are $$T = \frac{1}{2} \begin{pmatrix} 1 & 1 \\ 1 & -1 \end{pmatrix}, T^{-1} = \begin{pmatrix} 1 & 1 \\ 1 & -1 \end{pmatrix}.$$

In some embodiments, for the lossy attribute compression condition, only the transform coefficients are quantized and entropy encoded; for the limited-lossy attribute compression condition, additional calculation of the residual values is required, and both the transform coefficients and the residual values are quantized and entropy encoded. The residual values are calculated as follows. First, the quantized transform coefficients are dequantized and inversely transformed to obtain the reconstructed point cloud attributes. Then the inverse color space conversion is performed to obtain the reconstructed attribute values in original color space, e.g. the RGB color space, and then the differences between the reconstructed attribute values and the original attribute values are calculated as the residual values.

In summary, the present invention uses the binary tree to realize the Haar wavelet transform of point cloud attributes, which effectively solves the problem of sparse characteristics of point cloud data and can enhance the utilization of attribute correlation between child nodes, thus effectively improving the performance of point cloud attribute compression; the present invention uses the designed residual encoding processing module and residual decoding processing module to realize lossless compression and limited-lossy compression with the hausdorff error as the evaluation criterion. For color attributes, the invented transform performed in YUV color space and the residual processing module performed in RGB color space can achieve efficient encoding performance; the residual encoding processing module and the residual decoding processing module provided by the present invention and the invented transform method can be combined in a way that is mutually independent, and users can decide whether to use residual coding according to their needs. The residual encoding processing module and residual decoding processing module can be used as a general post-processing technique and combined with other coding methods to achieve lossless and near-lossless attribute compression.

Finally, it should be noted that the above embodiments are only used to illustrate the technical solution of the present invention, not to limit it; despite the detailed description of the invention with reference to the foregoing embodiments, it should be understood by those of ordinary skill in the art that it is still possible to modify the technical solution recorded in the foregoing embodiments, or to make equivalent substitutions for some of the technical features thereof; and these modifications or substitutions do not make the essence of the corresponding technical solution depart from the gist and scope of the technical solution of the embodiments of the present invention.

What is claimed is:

1. A point cloud attribute encoding method, comprising:

constructing an N-layer binary tree by partitioning a target point cloud according to positions of points within the point cloud, N being an integer greater than 1;

for a target node at layer P of the binary tree, obtaining child nodes of the target node, P being an integer greater than or equal to 1 and less than or equal to N−1;

transforming first attribute coefficients of the child nodes, comprising:

transforming from layer N−1 to layer 1 of the N-layer binary tree based on the constructed N-layer binary tree;

for each node at layer z of the binary tree, wherein z=Z,Z+1, . . . ,N−1: if the node has two child nodes, determining the first attribute coefficient and second attribute coefficient of the node by transforming the first attribute coefficients of the two child nodes with a transform matrix $$T_2 = \frac{1}{2}\begin{pmatrix} 1 & 1 \\ 1 & -1 \end{pmatrix};$$

if the node has only one child node, the node has only the first attribute coefficient without the second attribute coefficient, determining the first attribute coefficient of the node equal to the first attribute coefficient of the child node;

for each node at layer n of the binary tree, wherein n=1, 2, . . . . Z−1: if the node has two child nodes, determining the first attribute coefficient and the second attribute coefficient of the node by transforming the first attribute coefficients of the two child nodes with a transform matrix $$T_1 = \frac{1}{\sqrt{2}}\begin{pmatrix} 1 & 1 \\ 1 & -1 \end{pmatrix};$$

if the node has only one child node, the node has only the first attribute coefficient without the second attribute coefficient, determining the first attribute coefficient of the node equal to the first attribute coefficient of the child node multiplied by $\sqrt{2}$;

configuring using the first attribute coefficient of a root node and the second attribute coefficients of each target node in the binary tree as output coefficients of the point cloud attribute encoding method;

encoding the output coefficients to obtain a bitstream of transform coefficients;

wherein the first attribute coefficient of each leaf node in the binary tree is a point cloud attribute value of the leaf node, and the leaf node has no second attribute coefficient.

2. The point cloud attribute encoding method of claim 1, wherein the binary tree comprises: a binary tree based on a point cloud geometry and a set one-dimensional order; or a K-dimensional tree (K-D tree) based on the point cloud geometry and a set S-dimensional order, S being a natural number.

3. The point cloud attribute encoding method of claim 1, wherein the N-layer binary tree is a K-D tree based on a point cloud geometry and a set S-dimensional order, for the target nodes at different layers of the N-layer K-D tree, the transforming comprises:

for each node at layer N−2 of the N-layer K-D tree, obtaining child nodes of the node at layer N−1 and layer N, determining the first attribute coefficient and the second attribute coefficients of the node based on the first attribute coefficients of the child nodes;

for each node at layer M of the K-D tree, obtaining two child nodes of the node, determining the first attribute coefficient and the second attribute coefficients of the node by transforming the first attribute coefficients of the two child nodes with Haar wavelet, wherein M being an integer greater than or equal to 1 and less than or equal to N−3.

4. The point cloud attribute encoding method of claim 3, wherein determining the first attribute coefficient and the second attribute coefficients for each node at the layer N−2 of the N-layer K-D tree comprises:

for each non-leaf node at the layer N−1 of the N-layer K-D tree, obtaining two child nodes of the node, determining the first attribute coefficient of the node as (a1+a2)/2 and the second attribute coefficient as (a1−a2)/2, wherein a1 and a2 being the first attribute coefficients of the two child nodes, respectively;

for each node at the layer N−2 of the N-layer K-D tree, obtaining two child nodes of the node, determining the first attribute coefficient and the second attribute coefficients of the node with the first attribute coefficients of the two child nodes in the same way as described above, taking the second attribute coefficients of the two child nodes also as the second attribute coefficients of the target node.

5. The point cloud attribute encoding method of claim 3, wherein determining the first attribute coefficient and the second attribute coefficients for each node at the layer N−2 of the N-layer K-D tree comprises:

for each node at the layer N−2 of the N-layer K-D tree, obtaining K child nodes of the node at the layer N−1 and the layer N, K being an integer greater than or equal to 2 and less than or equal to 4, performing a one-dimensional discrete cosine transform on the first attribute coefficients of the K child nodes, taking low-frequency Direct Current (DC) coefficient as the first attribute coefficient of the node, taking remaining high-frequency Alternating Current (AC) coefficients as the second attribute coefficients of the node; normalizing the first attribute coefficient and the second attribute coefficients of the node by dividing with $\sqrt{K}$.

6. The point cloud attribute encoding method of claim 3, wherein determining the first attribute coefficient and the second attribute coefficients for each node at each layer from layer N−3 to layer 1 of the N-layer K-D tree comprises:

obtaining two child nodes of the node, with the first attribute coefficients of the two child nodes being a1 and a2 respectively;

determining the first attribute coefficient of the node as (a1+a2)/$\sqrt{2}$ and the second attribute coefficient of the node as (a1−a2)/$\sqrt{2}$ by transforming the first attribute coefficients of the two child nodes with Haar wavelet transform.

7. The point cloud attribute encoding method of claim 1, wherein encoding the output coefficients to obtain a bitstream of transform coefficients comprises:

entropy encoding the output coefficients to obtain a bitstream of transform coefficients; or, quantizing the output coefficients to obtain quantized transform coefficients; entropy encoding the quantized transform coefficients to obtain a bitstream of the quantized transform coefficients.

8. The point cloud attribute encoding method of claim 1, wherein encoding the output coefficients to obtain a bitstream of transform coefficients comprises:

determining an attribute residual value of a point in the point cloud as a difference between an original attribute value and a reconstruction attribute value; entropy encoding the attribute residual value to obtain a bitstream of the attribute residual value;

or, determining an attribute residual value of a point in the point cloud as a difference between an original attribute value and a reconstruction attribute value; quantizing the attribute residual value to obtain a quantized attribute residual coefficient; entropy encoding the quantized attribute residual coefficient to obtain a bitstream of the attribute residual value;

or, determining an attribute residual value of a point in the point cloud as a difference between an original attribute value and a reconstruction attribute value; quantizing the attribute residual value to obtain a quantized attribute residual coefficient; entropy encoding the quantized attribute residual coefficient to obtain a bitstream of the attribute residual value; entropy encoding a remainder value of attribute quantization.

9. A point cloud attribute encoding device, comprising:

one or more processors, a memory, an encoding module and a bus;

the memory storing program instructions which is executable by the one or more processors;

the bus connecting the one or more processors and the memory;

the one or more processors configured for calling the encoding module to execute the program instructions to implement the steps in the method of claim 1.

10. A point cloud attribute decoding method, comprising:

constructing an N-layer binary tree by partitioning a target point cloud according to positions of points within the point cloud, N being an integer greater than 1;

decoding a bitstream of the point cloud to obtain transform coefficients of the point cloud;

for target nodes at different layers of the N-layer binary tree, inversely transforming the transform coefficients decoded from the bitstream as reconstructed input coefficients of the inverse transform comprises:

inversely transforming from layer 1 to layer N−1 of the binary tree based on the constructed N-layer binary tree;

for each node at layer n of the binary tree, wherein n=1,2, . . . ,Z−1: if the node has two child nodes, determining two reconstructed output coefficients of the node by inversely transforming the reconstructed input coefficients of the node with an inverse transform matrix $$T_1^{-1} = \frac{1}{\sqrt{2}} \begin{pmatrix} 1 & 1 \\ 1 & -1 \end{pmatrix}$$

as the reconstructed input coefficients of the inverse transform of the two child nodes at layer n+1 of the node; if the node has only one child node, the node has only one reconstructed input coefficient, determining the reconstructed output coefficient of the node equal to the reconstructed input coefficient of the node divided by $\sqrt{2}$ as the reconstructed input coefficient of the only one child node;

for each node at layer z of the binary tree, wherein z=Z,Z+1, . . . , N−1: if the node has two child nodes, determining the two reconstructed output coefficients of the node by inversely transforming the reconstructed input coefficients of the node with an inverse transform matrix $$T_2^{-1} = \begin{pmatrix} 1 & 1 \\ 1 & -1 \end{pmatrix}$$

as the reconstructed input coefficients of the two child nodes at layer z+1 of the node; if the node has only one child node, the node has only one reconstructed input coefficient, determining the reconstructed output coefficient of the node equal to the reconstructed input coefficient of the node;

determining reconstructed attribute values of the point cloud being the reconstructed coefficients of all leaf nodes.

11. The point cloud attribute decoding method of claim 10, wherein the binary tree comprises: a binary tree based on a point cloud geometry and a set one-dimensional order; or a K-D tree based on the point cloud geometry and a set S-dimensional order, wherein S being a natural number.

12. The point cloud attribute decoding method of claim 10, wherein the N-layer binary tree is a K-D tree based on a point cloud geometry and a set S-dimensional order, for the target nodes at different layers of the N-layer K-D tree, the inverse transform comprising:

for each node at layer 1 to layer N−3 of the N-layer K-D tree, determining reconstructed output coefficients of the node by inversely transforming reconstructed input coefficients with Haar wavelet;

for each node at layer N−2 of the N-layer K-D tree, determining reconstructed output coefficients of the node by inversely transforming reconstructed input coefficients of the node as reconstructed input coefficients of the child nodes at layer N−1 and layer N of the node.

13. The point cloud attribute decoding method of claim 12, wherein determining the reconstructed output coefficients of the node at layer 1 to layer N−3 of the N-layer K-D tree comprises:

determining the reconstructed output coefficients of the node as (b1+b2)/$\sqrt{2}$ and (b1−b2)/$\sqrt{2}$ by inversely transforming the reconstructed input coefficients of the node which are b1 and b2 respectively with Haar wavelet.

14. The point cloud attribute decoding method of claim 12, wherein determining the reconstructed output coefficients of the node at layer N−2 of the N-layer K-D tree comprises:

for each node at the layer N−2 of the N-layer K-D tree, obtaining two child nodes at layer N−1 of the node, determining the reconstructed output coefficients of the node as (b1+b2) and (b1−b2) by inversely transforming the reconstructed input coefficients of the node which are b1 and b2 respectively, determining the reconstructed output coefficients of the node as the reconstructed input coefficients of the two child nodes at the layer N−1 of the node;

for each non-leaf node at the layer N−1 of the N-layer K-D tree, obtaining two child leaf nodes at the layer N of the node, determining the two reconstructed output coefficients of the node in the same way as above by inversely transforming the reconstructed output coefficients from a previous layer and the transform coefficients decoded from the bitstream as the reconstructed input coefficients.

15. The point cloud attribute decoding method of claim 12, wherein determining the reconstructed output coefficients of the node at the layer N−2 of the N-layer binary tree comprises:

for each node at the layer N−2 of the N-layer binary tree, obtaining K child leaf nodes at the layer N−1 and the layer N of the node, K being an integer greater than or equal to 2 and less than or equal to 4, inversely normalizing the reconstructed input coefficients of the node by multiplying with $\sqrt{K}$, determining the K reconstructed output coefficients of the node by performing inverse one-dimensional discrete cosine transform.

16. The point cloud attribute decoding method of claim 10, wherein decoding the bitstream of the point cloud to obtain the transform coefficients of the point cloud comprising:

entropy decoding the bitstream of the point cloud to obtain the transform coefficients of the point cloud;

or, entropy decoding the bitstream of the point cloud to obtain quantized transform coefficients; dequantizing the quantized transform coefficients to obtain the transform coefficients of the point cloud.

17. The point cloud attribute decoding method of claim 10, wherein after determining the inversely-transformed reconstructed attribute values of the point cloud as the reconstructed coefficients of all leaf nodes, the method further comprises:

entropy decoding a bitstream of the point cloud to obtain attribute residual values; determining reconstructed attribute values of the point cloud as a sum of the attribute residual values and the inversely-transformed reconstructed attribute values of the point cloud;

or, entropy decoding a bitstream of the point cloud to obtain quantized attribute residual coefficients; dequantizing the quantized attribute residual coefficients to obtain dequantized attribute residual values; determining reconstructed attribute values of the point cloud as a sum of the dequantized attribute residual values and the inversely-transformed reconstructed attribute values of the point cloud;

or, entropy decoding a bitstream of the point cloud to obtain quantized attribute residual coefficients and quantized attribute residual remainders; dequantizing the quantized attribute residual coefficients to obtain dequantized attribute residual values; determining reconstructed attribute values of the point cloud as a sum of the dequantized attribute residual values, the quantized attribute residual remainders, and the inversely-transformed reconstructed attribute values of the point cloud.

18. A point cloud attribute decoding device, comprising:

one or more processors, a memory, a decoding module and a bus;

the memory storing program instructions which is executable by the one or more processors;

the bus connecting the one or more processors and the memory;

the one or more processors are configured for calling the decoding module to execute the program instructions to implement the steps in the method of claim 10.

* * * * *